No. 889,363. PATENTED JUNE 2, 1908.
F. W. GAEFCKE.
MOWER.
APPLICATION FILED APR. 24, 1907.

2 SHEETS—SHEET 1.

Witnesses
M. S. Rockwell
John S. Powers

Inventor
Frederick W. Gaefcke
By Chandler & Chandler
Attorneys

No. 889,363.

PATENTED JUNE 2, 1908.

F. W. GAEFCKE.
MOWER.
APPLICATION FILED APR. 24, 1907.

2 SHEETS—SHEET 2.

Witnesses
W. H. Rockwell
John S. Powers

Inventor
Frederick W. Gaefcke
By Chandler & Chandler
Attorneys

THE NORRIS PETERS CO., WASHINGTON, D. C.

UNITED STATES PATENT OFFICE.

FREDIRICK W. GAEFCKE, OF OTTAWA, ILLINOIS.

MOWER.

No. 889,363.   Specification of Letters Patent.   Patented June 2, 1908.

Application filed April 24, 1907. Serial No. 370,032.

*To all whom it may concern:*

Be it known that I, FREDIRICK W. GAEFCKE, a citizen of the United States, residing at Ottawa, in the county of Lasalle, State of Illinois, have invented certain new and useful Improvements in Mowers; and I do hereby declare the following to be a full, clear, and exact description of the invention, such as will enable others skilled in the art to which it appertains to make and use the same.

This invention relates to new and useful improvements in mowers, and it has particular reference to a hand operated mower for cutting lawns, and adapted for use in connection with high grass or weeds.

Figure 1:
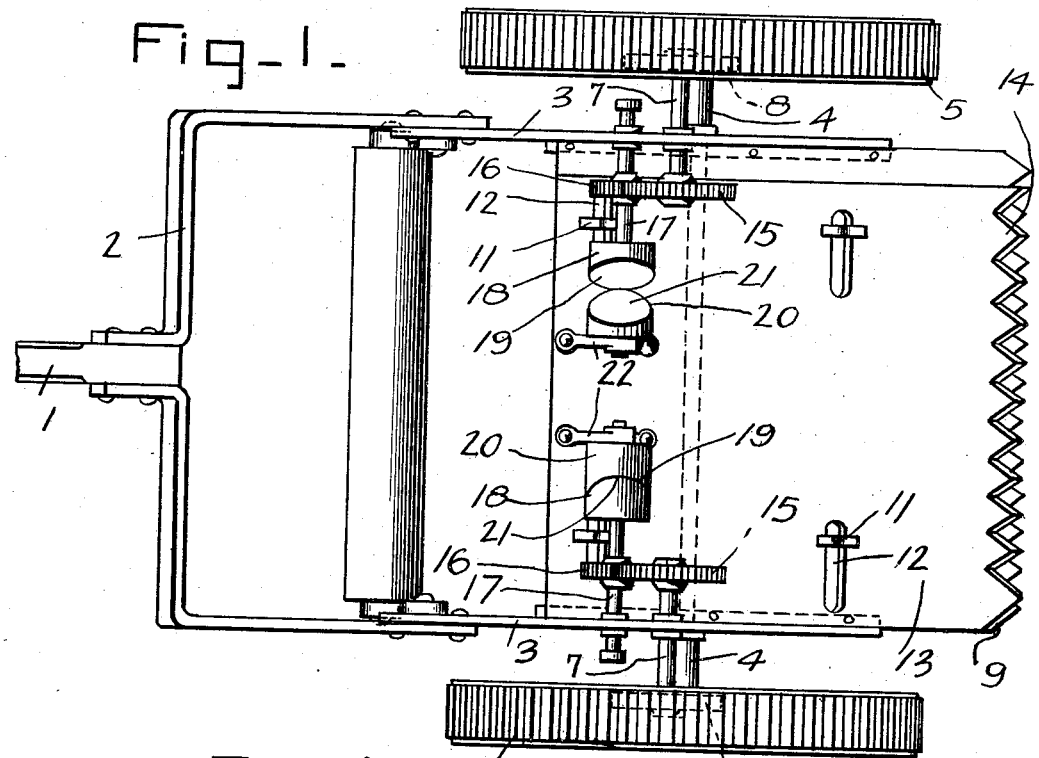
Figure 4:
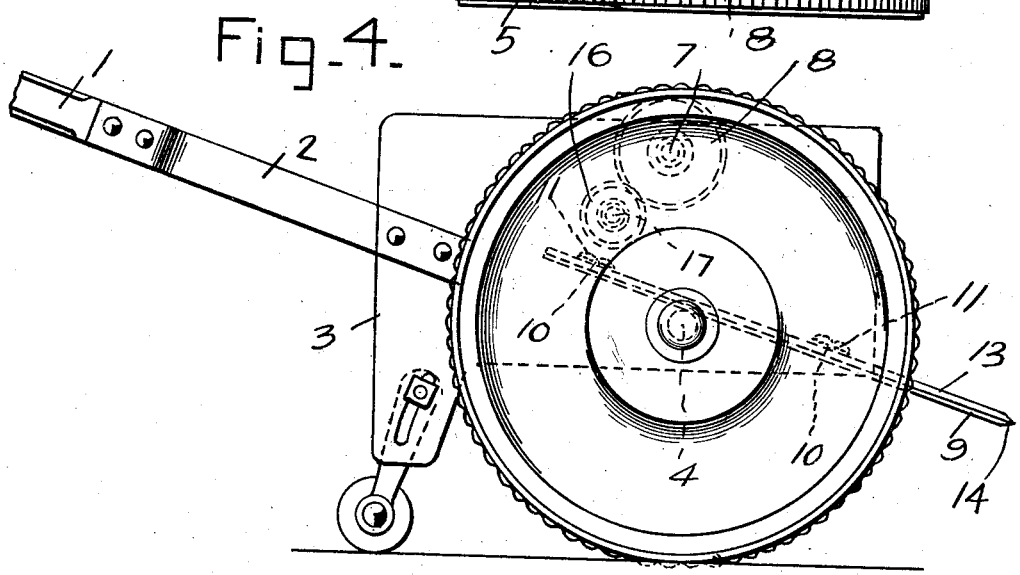
Figure 2:
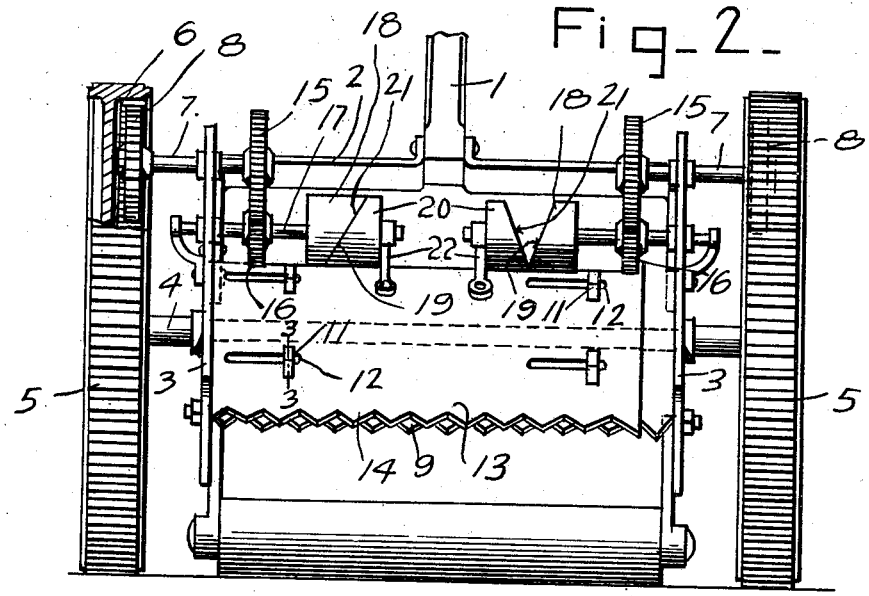
Figure 3:
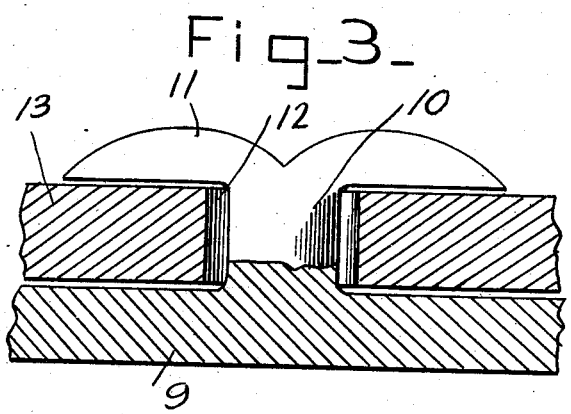

In connection with a mower of the above type the invention aims as a primary object to provide a novel construction, combination and arrangement of parts, the details of which will appear in the course of the following description, in which reference is had to the accompanying drawings forming a part of this specification, like characters of reference designating similar parts throughout the several views, wherein:

Figure 1 is a top plan view of a mower constructed in accordance with the present invention. Fig. 2 is a front elevation thereof. Fig. 3 is an enlarged vertical transverse section on the line 3—3 of Fig. 2. Fig. 4 is a side elevation thereof.

Referring specifically to the accompanying drawings, the numeral 1 designates a handle formed at its lower end with the yoke 2 having connection with plates 3 which constitute a supporting frame for the correlated parts. A transverse shaft 4 is mounted for rotation in the plates 3 and carries at its projecting ends the traction wheels 5, which are formed with internal gear teeth 6. In the plates 3 at each side thereof are journaled horizontal shafts 7 carrying on their outer ends gears 8 which are constantly in mesh with the gear teeth 6, the latter revolving about the former. The plates 3 conjointly support a transverse lower cutting knife 9 which is stationary and which is formed with upwardly extending studs 10 preferably constructed with fingers 11. The studs 10 project through slots 12 provided in a reciprocating knife 13 which is imposed upon the knife 9 and which is of less width than said knife 9. The knives 9 and 13 are similarly constructed with respect to their cutting edges and are formed with cutting teeth 14 of the usual construction. The shafts 7 afford means for operating the elements which reciprocate the knife 13 and in this function are provided on their inner ends with pinions 15 which mesh with and drive the pinions 16 provided on horizontal stub shafts 17, the latter being journaled in the respective plates 3. The shafts 17 project inwardly beyond the pinions 15 and carry on their inner ends disks 18 having cam faces 19. Non-rotatable disks 20 provided with cam faces 21 are supported from the knife 13 at each side thereof by brackets 22.

It will be noted from Fig. 1 that the cam disks 18 are so arranged with respect to each other as to alternately move the knife 13 in opposite directions and from opposite sides of the machine.

In operation, the machine is pushed by hand and the shafts 17 are rotated through the gearings described. Such rotation will by virtue of the contacting coöperating relation of the cam disks 18 and 20 reciprocate the knife 13 in the manner stated above. In the movement of the knife 13, the studs 10 coact with the slots 12 to constitute guides, and the fingers 11 of said studs which overlie said knife 13 prevent upward displacement thereof.

A lawn mower constructed in accordance with the present invention is exceedingly simple in construction, inexpensive to manufacture and practical and efficient in use.

From the foregoing description it will be seen that simple and efficient means are provided for accomplishing the objects of the invention, but, while the elements herein shown and described, are well adapted to serve the functions set forth, it is obvious that various minor changes may be made in the proportions, shape and arrangement of the several parts without departing from the spirit and scope of the invention as defined in the appended claims.

What is claimed is:

In a lawn mower, a handle carrying spaced side plates constituting a frame, a transverse shaft journaled in said side plates and carrying traction wheels, a stationary cutting knife supported between said side plates, a cutting knife imposed on said stationary knife for transverse reciprocating movement, stub shafts journaled in said side plates and provided at their inner ends with cam disks, cam disks fixed upon said reciprocating knife and contacting with said first named cam disks, said cam disks being arranged to move said reciprocating knife alternately in opposite directions, and gearing interposed between said stub shafts and said traction wheels to drive the former from the latter.

In testimony whereof, I affix my signature, in presence of two witnesses.

FREDIRICK W. GAEFCKE.

Witnesses:
 MARTIN GAEFCKE,
 HARRISON H. BECKER.